W. CASE.
Tea and Coffee Pot.
No. 32,969. Patented July 30, 1861.
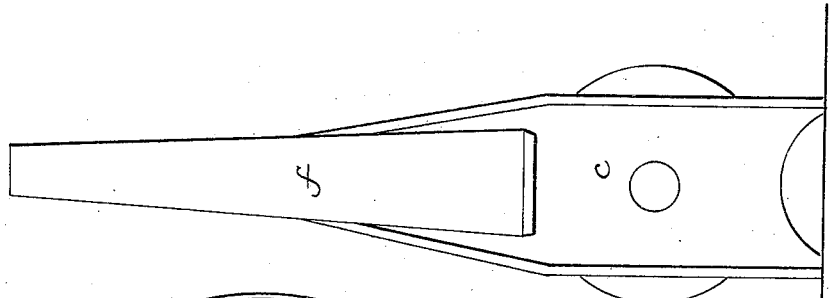
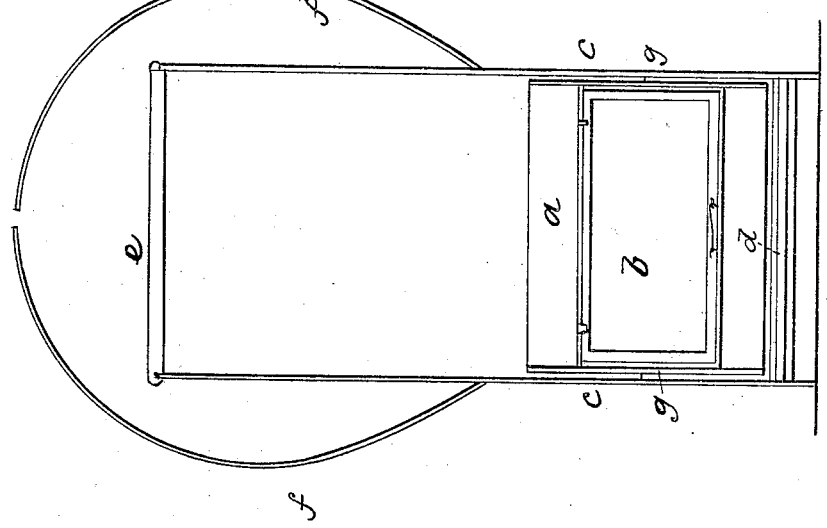
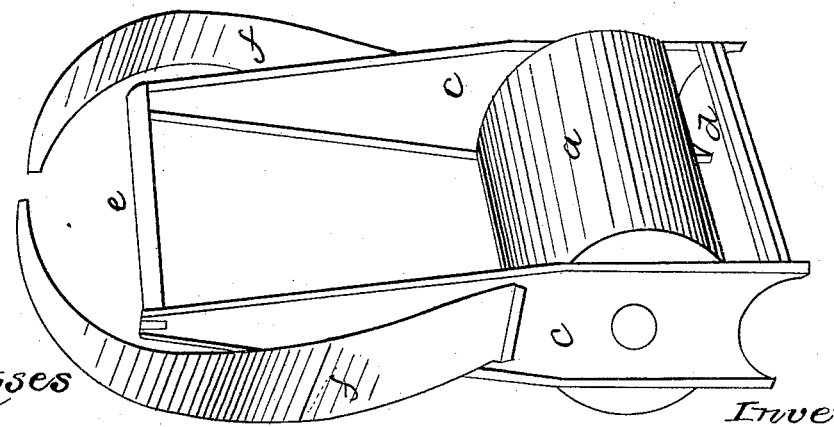

UNITED STATES PATENT OFFICE.

WELLINGTON CASE, OF WATERLOO, IOWA.

STRAINER FOR COFFEE AND TEA POTS.

Specification of Letters Patent No. 32,969, dated July 30, 1861.

*To all whom it may concern:*

Be it known that I, WELLINGTON CASE, of the town of Waterloo, Blackhawk county, and State of Iowa, have invented a new and useful Machine for Steeping Tea and Boiling Coffee; and I do hereby declare that the following is a full, clear, and exact description of the construction and operation of the same, reference being had to the annexed drawings, making a part of this specification, in which—

Figure 1 is a perspective view. Fig. 2 is a longitudinal elevation. Fig. 3 is an end view.

The nature of my invention consists in a brass gauze wire cylinder "$a$" in drawing with a door therein with tin heads to revolve on two iron journals "$g\ g$" in drawing supported by two upright tin supporters permanently fastened at the bottom and fastened at the top by a spring "E." On the sides of the two upright supporters are two springs "$f\ f$" to be made of tin or steel, the office of which is to retain the machine in its place in the vessel in which it may be placed for use, the tea or coffee to be put in the gauze cylinder "$a$" and the whole machine put in any ordinary coffee or tea pot. The cylinder will revolve by the action of the water boiling.

To enable others skilled in the art to make and use my invention, I will proceed to describe its construction and operation.

The cylinder heads are to be of two circular tin heads, to which is fastened by soldering brass gauze wire of any sufficient size to form the cylinder "$a$," in which I make a door "$b$" hung on tin hinges to be fastened together by a hook; the tea or coffee to be put in the brass cylinder "$a$;" this cylinder to be supported by two upright tin supporters "$c\ c$," which are fastened together permanently at the bottom by tin bars "$d$" and at the top by a spring clasp "E," so that it may be opened to remove the cylinder for cleaning; the cylinder to be so hung that it will revolve freely. On the sides of the supporters are two springs "$f\ f$" to be either of steel or tin to retain the boiler in its place in the pot or vessel used, all of which will be seen by the accompanying drawings, wherein the water boils; the cylinder revolves retaining the tea or coffee in its place in the cylinder.

What I claim as my invention, and desire to secure by Letters Patent, is—

The revolving cylinder tea and coffee boiler supported by two upright supporters with springs on each side, as seen in drawing.

Waterloo, Iowa, March 13, 1861.

WELLINGTON CASE.

Witnesses:
 CYRUS WATT,
 S. BAGG.